United States Patent [19]

Canteleux

[11] Patent Number: 5,556,159
[45] Date of Patent: Sep. 17, 1996

[54] DEVICES FOR LOCKING THE ADJUSTABLE COMPONENTS OF VEHICLE SEATS IN POSITION IN THE EVENT OF A SHOCK

[75] Inventor: Joël Canteleux, Armenonville, France

[73] Assignee: Bertrand Faure Automobile "BFA", France

[21] Appl. No.: 85,942

[22] Filed: Jul. 6, 1993

[30] Foreign Application Priority Data

Jul. 3, 1992 [FR] France ................... 92 08243

[51] Int. Cl.⁶ ............................................. B60N 2/42
[52] U.S. Cl. ........................ 297/216.1; 297/463.1
[58] Field of Search ................... 297/216.1, 216.15, 297/216.16, 216.19, 216.2, 463.1

[56] References Cited

U.S. PATENT DOCUMENTS

| | | | |
|---|---|---|---|
| 3,848,923 | 11/1974 | Dehler | 297/366 |
| 4,128,225 | 12/1978 | Kluting et al. | 248/241 |
| 4,143,913 | 3/1979 | Rumpf | 297/379 |
| 4,225,184 | 9/1980 | Strowick | 297/216.1 X |
| 4,707,010 | 11/1987 | Croft et al. | 297/379 |
| 4,733,912 | 3/1988 | Secord | 297/379 |
| 5,022,707 | 6/1991 | Beauvais et al. | 297/216.19 X |
| 5,366,268 | 11/1994 | Miller et al. | 297/216.1 |

FOREIGN PATENT DOCUMENTS

| | | |
|---|---|---|
| 2195948 | 3/1974 | France . |
| 2354215 | 1/1978 | France . |
| 2397507 | 2/1979 | France . |
| 2708461 | 8/1978 | Germany . |
| 3615160 | 11/1987 | Germany ................. 297/216.16 |
| 3841711 | 6/1990 | Germany . |
| 1336341 | 11/1973 | United Kingdom ........... 297/216.16 |
| 92/05978 | 4/1992 | WIPO . |

*Primary Examiner*—Milton Nelson, Jr.
*Attorney, Agent, or Firm*—Larson and Taylor

[57] ABSTRACT

A device for operating, in the event of a shock, to lock the adjustable seat-raising mechanism (5) interposed between the base (1, 2) and the seat proper (3, 4) of a vehicle seat, the device comprising a scissors linkage constituted by two links (6, 7) pivotally mounted to each other about an axis A, the first link (6) also being pivotally mounted about an axis B linked to the base, and the second link (7) also being pivotally mounted about an axis C located behind the first axis and linked to the seat proper, a circular sector (8) having a rough cylindrical surface (9) is centered on the axis A and is secured to the first link (6), a flyweight (10) is suspended from the axis C and includes a rough cylindrical bearing surface (11) that is eccentric and that is suitable for co-operating with a wedging effect with the cylindrical surface of the sector, and a spring (12) is interposed between the seat proper and the flyweight and urges the flyweight rearwards so long as it remains in its rest position, and forwards once it is in its locking position.

6 Claims, 3 Drawing Sheets

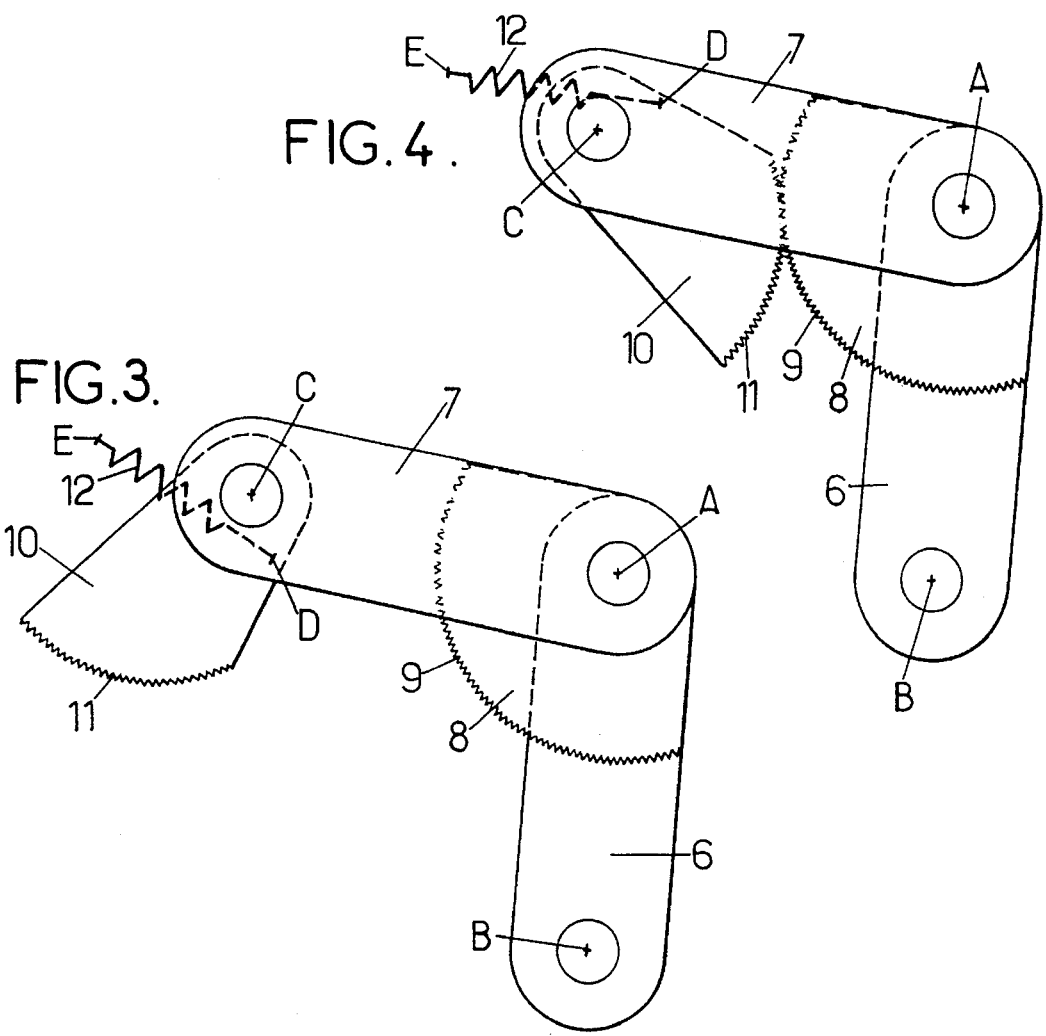
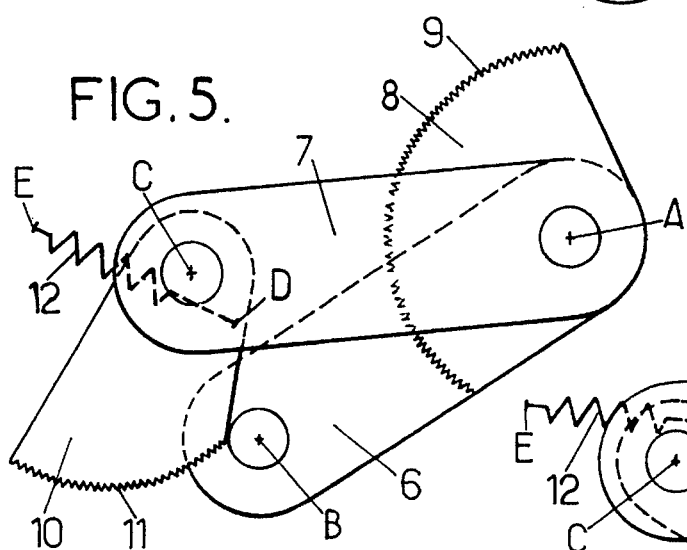
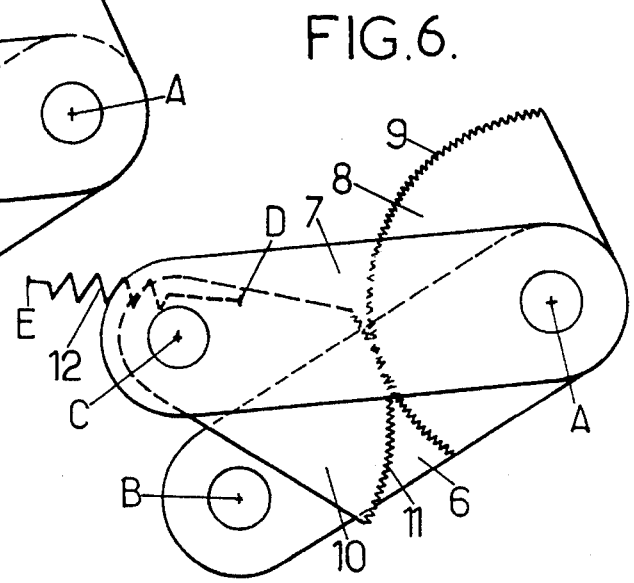

DEVICES FOR LOCKING THE ADJUSTABLE COMPONENTS OF VEHICLE SEATS IN POSITION IN THE EVENT OF A SHOCK

FIELD OF THE INVENTION

The invention relates to vehicle seats that include at least one component that is adjustable in position, and where it is desired that the component should be locked in its adjusted position in the event of the vehicle being subjected to a sudden shock.

BACKGROUND OF THE INVENTION

Such components comprise, in particular, a seat proper which is adjustable in height relative to a base, a seat back which is adjustable in slope relative to the seat proper, and also a headrest which is likewise adjustable in slope relative to the back.

The position-adjusting mechanisms of the components in question are generally designed to withstand the forces normally exerted on the components by a person sitting on the seat, and in particular the weight of the person, thrust from the person's back.

They are not always strong enough to withstand the sudden shocks to which vehicles are subjected during accidents, and in addition they may be left unlocked while being adjusted.

When such mechanisms are not strong enough or when they are not locked, the consequences for passengers in the event of a shock may be severe, for example as follows:

- a seat proper that is lifted relative to its base may drop suddenly, thereby causing the "anti-diving" bulge on the front edge of the seat proper to drop as well: since the seatbelt associated with the seat is generally secured to the body of the vehicle, its vertical position does not change, thereby causing the gap left for the user between the seat proper and the seatbelt to increase suddenly, thus making the belt completely ineffective since the body of the user is no longer held to the seat and is free to slide forwards; and
- the hinged back of the seat may tilt suddenly forwards, either because of its own mass or else because of the mass of the user when using a belt secured to the seat.

To remedy these drawbacks in the context of locking the angle of a vehicle seat back, proposals have already been made to suspend a pendulum mass or "flyweight" from a shaft linked to the frame of the seat proper, which mass has catches for co-operating with notches linked to the frame of the back in the event of sudden deceleration of sufficient force being applied to the vehicle (Document DE-A-2 708 461).

The angular locking obtained in that way is effective, but it can be achieved for a small number only of preadjusted angular positions of the back.

SUMMARY OF THE INVENTION

A main object of the invention is to propose mechanisms suitable for automatically locking the position-adjusting components of vehicle seats in their preadjusted positions, whatever those positions might be, whenever deceleration exceeding a certain threshold is applied to the seats concerned.

To this end, a locking device of the invention for mounting between a vehicle seat component that is adjustable in position and the support for said component, likewise includes a flyweight suspended from an axis, responsive to vehicle deceleration, and organized so as to lock a hinge when deceleration exceeds a certain threshold, and it is essentially characterized in that it further comprises a scissors linkage comprising two links having respective first ends pivotally mounted to each other about a first transverse horizontal axis, the second end of the first link being pivotally mounted about a second transverse horizontal axis linked to the support of the component, and the second end of the second link being pivotally mounted about a third transverse horizontal axis disposed behind the first and linked to the component, and a circular sector having a rough or toothed cylindrical surface centered on the first axis and secured to the first link, in that the flyweight is suspended from the third axis and includes a rough or toothed cylindrical bearing surface that is eccentric relative to said axis and that is suitable for co-operating with a wedging effect with said cylindrical surface of the above sector, and in that a spring is interposed between the component and the flyweight so as to urge the flyweight angularly rearwards while it is in its rest position and, on the contrary, so as to urge it angularly forwards while it is in its locking position.

In preferred embodiments, use is also made of one and/or more of the following dispositions:

- the spring is rated so that the flyweight remains stationary so long as the deceleration applied to the seat remains below a predetermined threshold, preferably equal to 100 m/s$^2$;
- the position-adjustable component of the vehicle seat is the seat proper thereof, the support of said component being the base of said seat;
- the position-adjustable component of the vehicle seat is the back thereof, the support of said component being the base of said seat; and
- the seat is fitted with two locking devices of the kind defined above, placed on respective sides thereof.

In addition to these main dispositions, the invention includes certain other dispositions which are preferably used simultaneously therewith and which are described in greater detail below.

BRIEF DESCRIPTION OF THE DRAWINGS

Two preferred embodiments of the invention are described below, naturally in non-limiting manner, with reference to the accompanying drawings.

FIGS. 3 to 6 are diagrammatic side views of the above device respectively showing:

- the raising mechanism in the high position and the device in the rest position (FIG. 3);
- the raising mechanism in the high position and the device in the locking position (FIG. 4);
- the raising mechanism in the low position and the device in the rest position (FIG. 5); and
- the raising mechanism in the low position and the device in the locked position (FIG. 6).

Figure 7:
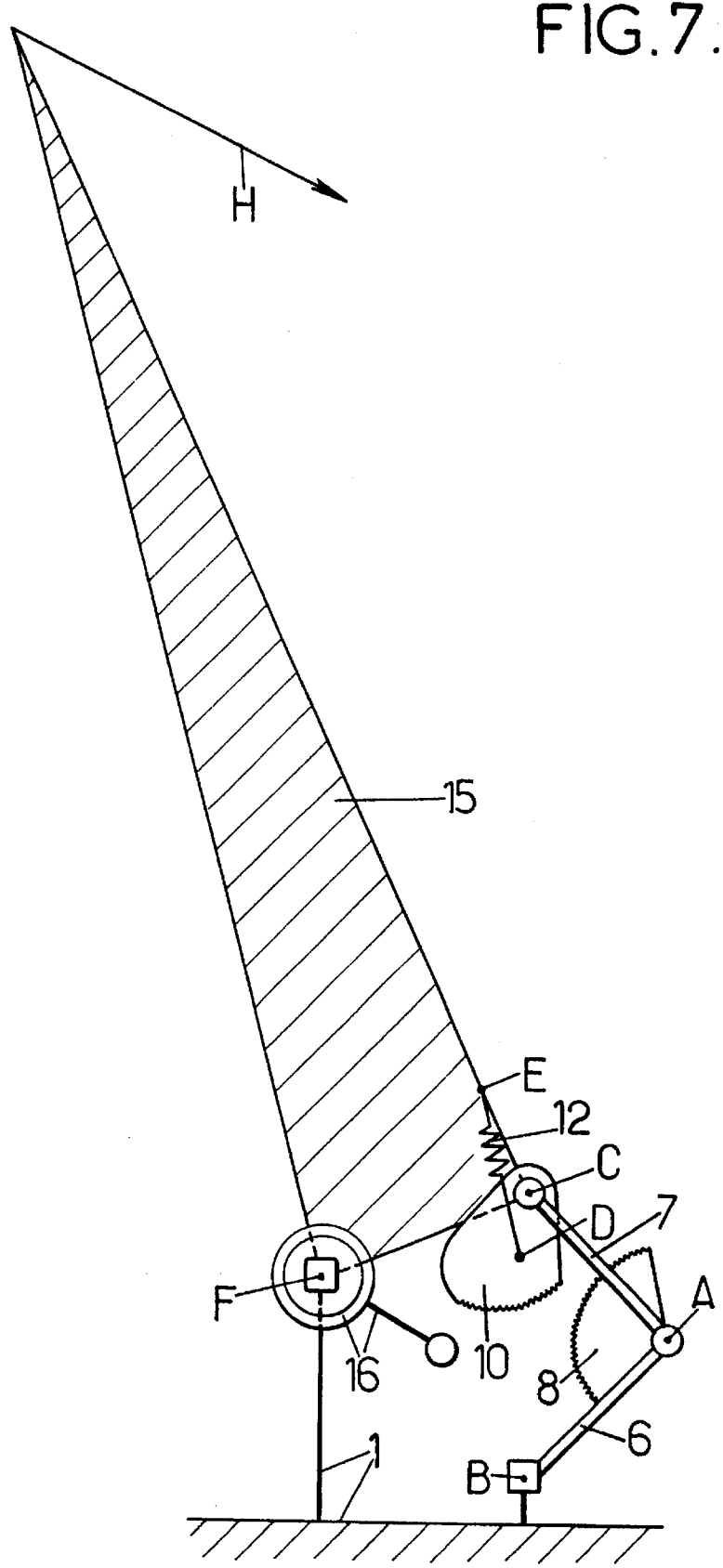

FIG. 7 is a diagrammatic side view of the back of a vehicle seat in which the seat back is pivotally mounted on the base of the seat and is fitted with a locking device of the invention.

DESCRIPTION OF THE PREFERRED EMBODIMENTS

In the first embodiment shown in FIGS. 1 to 6, the vehicle seat under consideration comprises, inter alia:

- a base 1 for fixing to the floor of the vehicle, the base including, in particular, slideways 2 enabling the forwards and backwards position of the seat to be adjusted;
- a seat proper 3 that comprises, in particular, a rigid frame 4 and a cushion (not shown); and
- a seat-raising mechanism 5 interposed vertically between the slideways and the seat proper and enabling the height and/or the slope of the seat proper to be adjusted at will, said mechanism comprising, in particular, four sloping links that are parallel in pairs, two in front and two behind.

The seat-raising mechanism 5 is associated with position-securing means enabling it to be secured in each of its adjustment positions.

These position-securing means are strong enough to withstand forces due to the weight of a user sitting on the seat in question.

Unfortunately, they are often not strong enough to withstand the very high forces that are applied to seats, and above all to seat users, by the sudden decelerations due to accidental shocks.

To reinforce such position-securing means, use is made of a scissors linkage comprising two links 6 and 7 pivoted to each other at respective first ends about a first transverse horizontal axis A, with the second end of the first link 6 being pivotally mounted about a second transverse horizontal axis B connected to the base 1 and with the second end of the second link 7 being pivotally mounted about a third transverse horizontal axis C connected to the frame 4 of the seat proper and located behind the first axis A.

Figure 1:
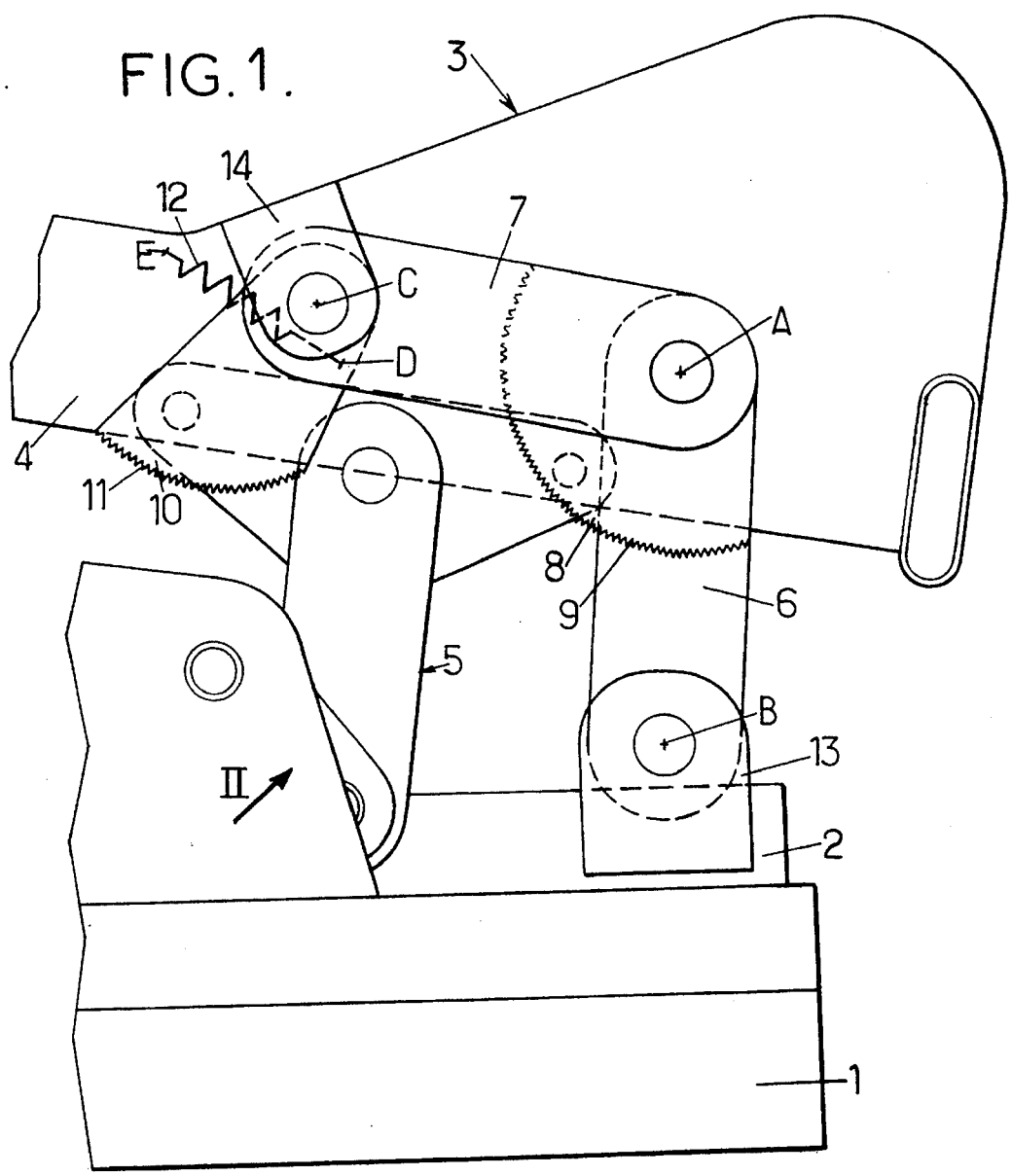
FIG. 1 of the drawings is a diagrammatic side view of the front of a vehicle seat fitted with a raising mechanism and with a locking device of the invention.
Figure 2:
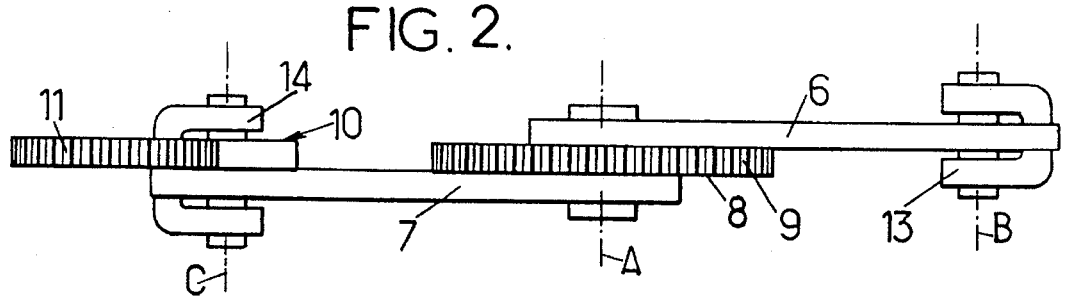
FIG. 2 is a view of the same device seen on arrow II of FIG. 1.

As can be seen in FIG. 2, each of the axes A, B, and C is embodied by means of a rivet or the like, and the connection between each of the axes B and C and the structure 2 or 4 that carries it is provided by means of forks (13, 14) welded to the structure in question.

Provision is also made for:

- a circular sector 8 centered on the axis A, secured to the first link 6, and externally defined by a cylindrical bearing surface 9 having a surface that is rough or toothed; and
- suspended from the axis C, a flyweight 10 that also has a cylindrical bearing surface 11 with a surface that is rough or toothed, and that is mounted eccentrically relative to the axis C.

The dimensions and the eccentricity of the bearing surface 11 are designed so as to enable it to co-operate with a wedging effect with the surface 9 of the sector 10 whenever the flyweight 10 swings towards said sector 8 so as to come into contact herewith.

Finally, a spring 12 has two ends D and E respectively fixed to the flyweight 10 and to the frame 4 of the seat proper to urge said flyweight angularly backwards when it is in a rest position.

The spring 12 is also disposed and installed in such a manner that the resilient force that it applies to the flyweight 10 acts angularly forwards once the bearing surface 11 of the flyweight has come into contact with the bearing surface 9.

To this end, the spring 12 is advantageously a tension coil spring and its point of connection D with the flyweight 10 passes through the plane defined by the point E and the axis C when said flyweight swings forwards due to a shock being applied to the seat.

The locking mechanism as described above operates as follows.

At rest, i.e. so long as there is no need to lock the seat-raising mechanism 5, the flyweight 10 remains placed in its rear position towards which it is urged by the spring 12 and in which its bearing surface 11 is at a distance from the bearing surface 9.

This situation can be seen to occur for any adjustment position of the seat-raising mechanism, i.e. both when the seat is high (FIG. 3) and when the seat is low (FIG. 5).

So long as the amplitude of the decelerations to which the vehicle is subjected remain low, as applies with small shocks or sudden braking that correspond to decelerations of 20 meters per second squared (m/s$^2$) or 30 m/s$^2$, or even as much as 50 m/s$^2$, the flyweight 10 stays in place.

In contrast, as soon as the acceleration applied to the vehicle exceeds a predetermined threshold for which the spring 12 is rated, which threshold may be equal to 100 m/s$^2$, for example, the flyweight 10 swings forwards against the return force of the spring until the bearing surface 11 of the flyweight comes into contact with the bearing surface 9.

As it swings forwards, the flyweight goes past a dead center position in which the angular force exerted by the spring becomes zero and which corresponds to the point D passing through the plane defined by the axis C and by the point E.

Immediately after passing through this position, the force exerted by the spring 12 on the flyweight 10 changes direction: thereafter the flyweight is urged forwards, thereby instantaneously reinforcing the tendency of the bearing surface 11 to press against the bearing surface 9.

Given the eccentric shape of the bearing surface 11, a wedging effect is obtained between these two bearing surfaces that are firmly applied against each other, and this occurs equally well in high positions of the seat-raising mechanism (FIG. 4) and in low positions thereof (FIG. 6), and in all intermediate positions.

Because of the wedging effect, the scissors linkage constituted by the two links 6 and 7 becomes undeformable, and it is no longer possible to change the relative angle between these two links.

As a result, the separation between the two axes B and C can no longer be changed and the seat proper remains locked in its preadjusted position, even if the means for securing the seat-raising mechanism 5 itself are no longer effective.

The resulting locking is generally not reversible.

In order to ensure that forces are properly distributed, it is appropriate to mount a locking device of the kind described above on either side of the front of the seat, with the devices being hidden, in particular, beneath the front transverse rim of the seat cushion.

In the second preferred embodiment shown in FIG. 7, the vehicle seat includes, inter alia:

- a base 1 as defined above; and
- a back 15 pivotally mounted about an axis F secured to the base.

A mechanism 16 makes it easy for a person sitting in the seat to adjust the inclination of the back 15 about the axis F.

A locking mechanism that is entirely identical to that described above for the first embodiment of the invention is interposed between the base 1 and the back 15, and the same references are used as before.

In particular, there can be seen two links 6 and 7 pivotally mounted to each other about the axis A, the circular sector 8 having a rough surface that is secured to the link 6 and that is centered on said axis A, the flyweight 10 having a rough cylindrical bearing surface 11 that is eccentric relative to the axis C, and that hangs from said axis, and the spring 12 that is tensioned between its two ends D and E.

In this embodiment, the axis B is secured to the base 1, the axis C is secured to the framework of the seat back 15, as is the axis E, while the axis D is secured to the flyweight 10, as before.

The mechanism as described in this way operates in exactly the same way as before, with the flyweight 10 coming into co-operation with the sector 8 as soon as a sudden shock is applied to the vehicle.

The resulting locking is particularly advantageous when the seatbelt fitted to the seat in question has one of its anchor points disposed at the top of the back, as represented by arrow H in FIG. 7.

As a result, whichever embodiment is used, a device is obtained that makes it possible to lock a position-adjusting component of a vehicle seat in its adjusted position in the event of a severe shock, with the structure and the operation of the device being made sufficiently clear in the above description.

This device has numerous advantages over previously known devices, and in particular it has the advantage of being both very simple and highly effective, and the advantage of being easily mounted in parallel on any kind of position-adjusting mechanism (seat raising, back tilting etc.)

Naturally, and as can be seen from the above description, the invention is not limited in any way to the particular embodiment and application that have been described in detail; on the contrary, it extends to any variants thereof.

I claim:

1. A device for locking a position-adjustable component of a vehicle seat in case of a shock, the device including a flyweight suspended from an axis, responsive to deceleration of a vehicle, and disposed to lock a hinge once said deceleration exceeds a certain threshold, the device further comprising a scissors linkage comprising first and second links having respective first ends pivotally mounted to each other about a first transverse horizontal axis, a second end of the first link being pivotally mounted about a second transverse horizontal axis linked to a support of a position-adjustable component, and a second end of the second link being pivotally mounted about a third transverse horizontal axis disposed behind the first end of the second link and linked to the position-adjustable component, and a circular sector having a rough cylindrical surface centered on the first axis and secured to the first link, the flyweight being suspended from the third axis and including a rough cylindrical bearing surface eccentric relative to said third axis and suitable for co-operating with a wedging effect with said cylindrical surface of the circular sector, and including a spring interposed between the position-adjustable component and the flyweight to urge the flyweight angularly rearwards while the spring is in a rest position and to urge the flyweight angularly forwards while the spring is in a locking position.

2. A locking device according to claim 1, wherein the position-adjustable component comprises a back of the vehicle seat, the support of said position-adjustable component being a base of said seat.

3. A locking device according to claim 1, wherein the spring holds the flyweight stationary when the deceleration applied to the seat remains below a predetermined threshold.

4. A locking device according to claim 3, wherein the position-adjustable component comprises a seat proper of the vehicle seat, the support of said position-adjustable component being a base of said seat.

5. The locking device according to claim 3, wherein the spring holds the flyweight stationary when the deceleration of the seat is no greater than 100 m/s$^2$.

6. A vehicle seat comprising two locking devices placed on respective sides of the seat, each of said devices including a flyweight suspended from an axis, responsive to deceleration of a vehicle, and disposed to lock a hinge once said deceleration exceeds a certain threshold, each of said devices further comprising a scissors linkage comprising first and second links having respective first ends pivotally mounted to each other about a first transverse horizontal axis, a second end of the first link being pivotally mounted about a second transverse horizontal axis linked to a support of a position-adjustable component of the vehicle seat, a second end of the second link being pivotally mounted about a third transverse horizontal axis disposed behind the first end of the second link and linked to the position-adjustable component, and a circular sector having a rough cylindrical surface centered on the first axis and secured to the first link, the flyweight being suspended from the third axis and including a rough cylindrical bearing surface eccentric relative to said third axis and suitable for co-operating with a wedging effect with said cylindrical surface of the circular sector, and including a spring interposed between the position-adjustable component and the flyweight to urge the flyweight angularly rearwards while the spring is in a rest position and to urge the flyweight angularly forwards while the spring is in a locking position.

* * * * *